United States Patent Office 3,232,082
Patented Feb. 1, 1966

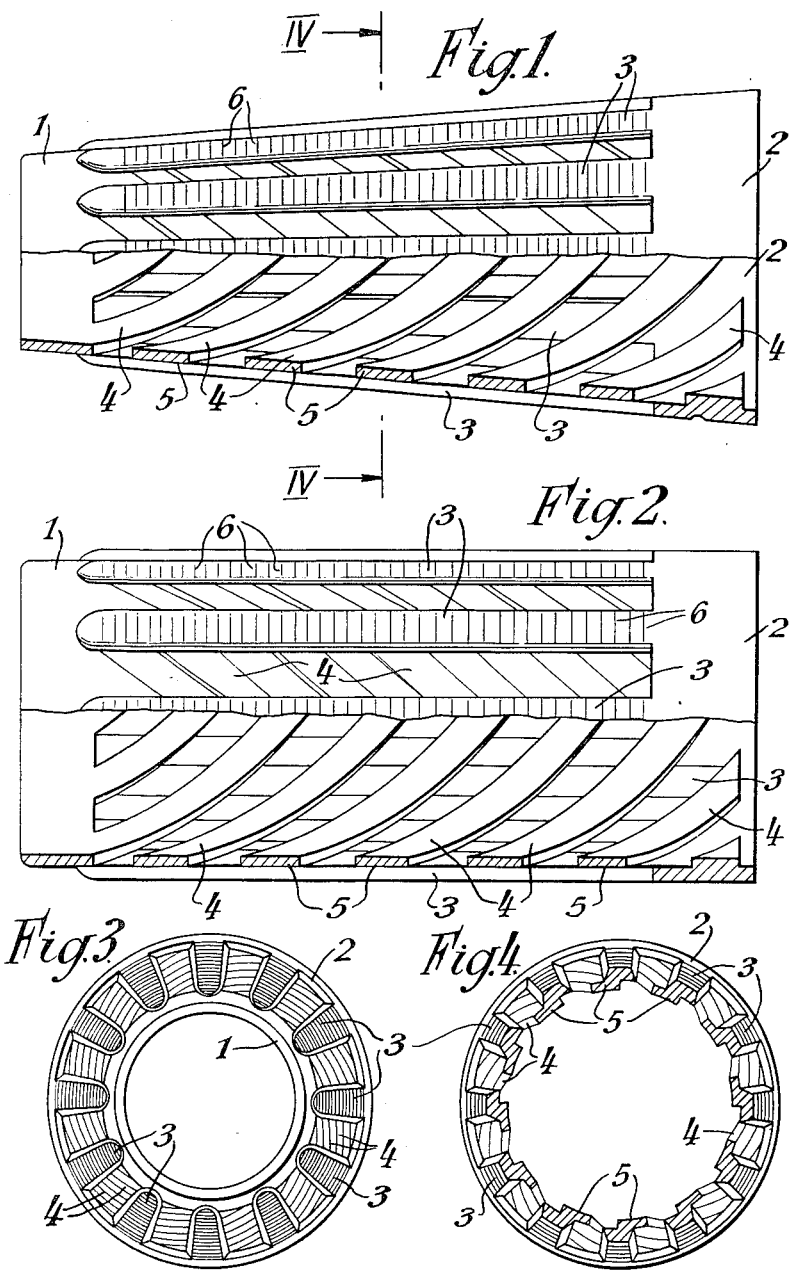

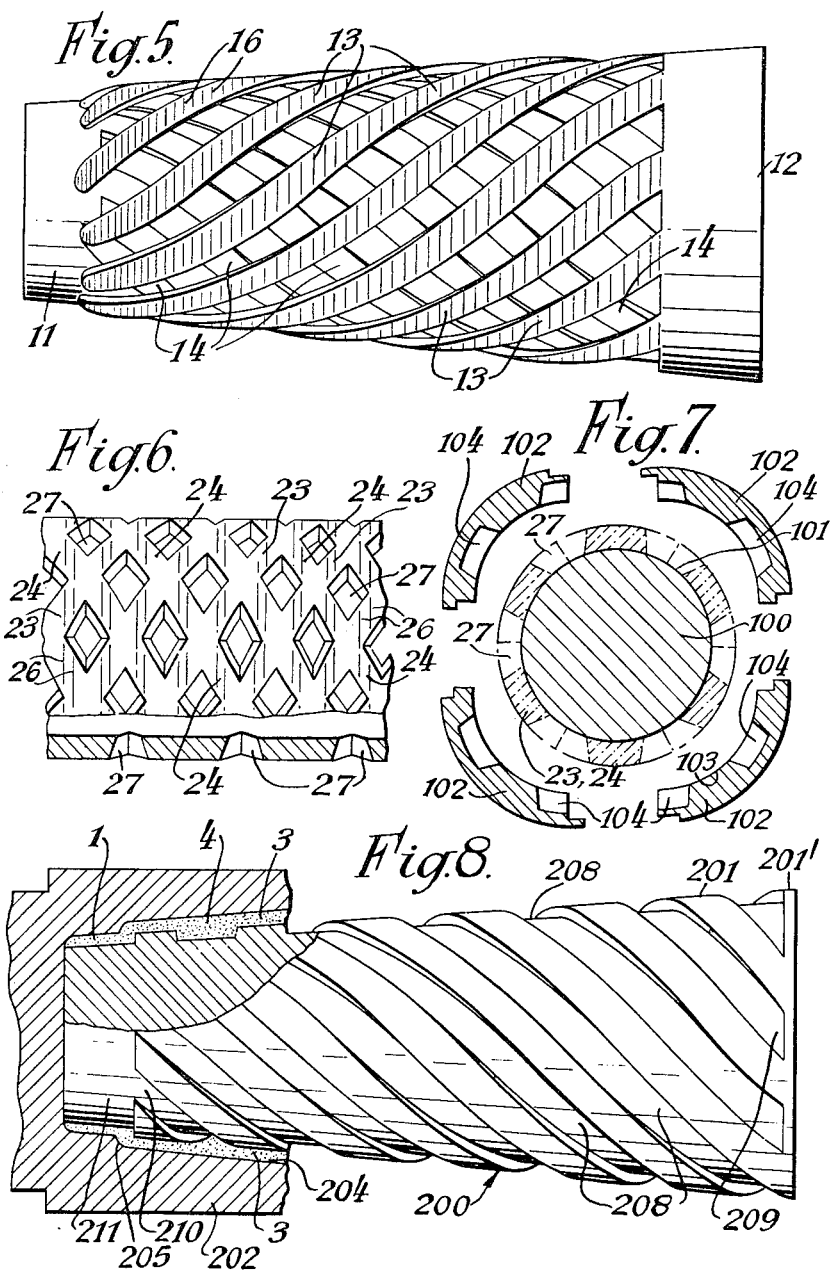

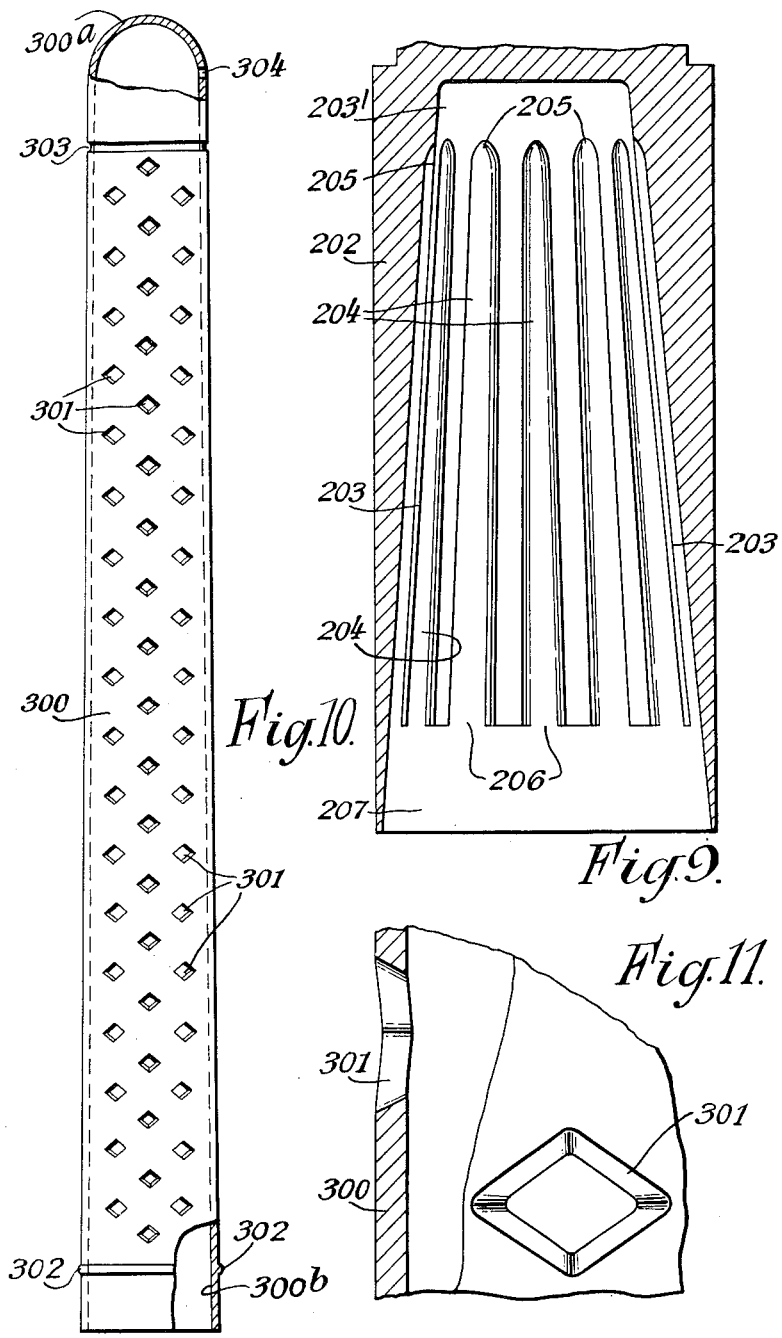

3,232,082
YARN TUBE
Paul Adolf Fallscheer, Reutlingen, Württemberg, Germany, assignor to Dye Tube Developments Limited, Bury, England, a British company
Filed Dec. 3, 1962, Ser. No. 241,951
Claims priority, application Germany, Dec. 1, 1961;
A 38,909
14 Claims. (Cl. 68—198)

For the wetting, dyeing, bleaching and washing of yarns it is known to wind the yarns into package form on perforated tubes and then to drive the treatment liquor through the yarn package. In order that the liquor cannot flow out at the ends of the packages, it is known to form the ends of the perforated tubes as closure rings which, during the treatment lie against corresponding closure plates.

It is known also to make such perforated tubes in a casting, pressing or injection procedure. In this procedure it is necessary for the mould in which the tube is to be made to consist of inner and outer mould parts, which two mould parts contact each other at the places where there are to be perforations in the tube. At these contact places the outer mould part is provided with inwardly-directed pins or studs, the inner ends of which lie on the outer face of the inner mould part. In order to be able to separate the mould parts from each other after the casting, pressing or injection procedure it is necessary to form the outer mould part in several sections. The number of sections of the mould leads to the formation of ridges on the outer face of the moulded tube, which render a subsequent treatment necessary. The said pins or studs on the inner face of the outer mould part render difficult, to an extraordinary extent, the manufacture of that mould part and also, during the manufacture of the tube, they lead to flow seams which adversely influence the strength of the finished tube.

The problem to which the present invention is directed is to provide a perforated tube having sealing faces at its ends useful for the wet treatment of yarn packages, and which is made by a casting, pressing or injection procedure, which is capable of being manufactured without flow seams and with mould parts which can be made as simply and as cheaply as possible.

This problem is solved according to the invention in that the tube body, or one piece hollow moulding, consists of at least one series of bars, or webs, running straight or helically along the outer surface of the tube connecting the closure rings. Thereby the possibility is given according to a further feature of the invention of using a mould in which both mould parts contact in a face concentric with the upper face of the sleeve and in which, for the bars and closure rings in at least one mould part, straight or helical or annular channels are provided whereby the annular channels for the sealing rings communicate with the channels for the bars. Such mould parts provided with straight, helical and annular channels permit of a seamingly simple manufacture with the usual tools. The channels ensure a continuous flow of the material to be cast, pressed or injected so that no flow seams can result.

If the moulding according to the invention consists of only one set of straight or helical bars or of two sets of bars which contact and are connected in the contact faces to one another then both mould parts may be formed in one piece whereby the manufacture of the mould parts is substantially simplified and cheapened and the formation of ridges on the tube is completely obviated so that a subsequent treatment of the tube is no longer necessary. The formation in one piece of the mould part is therefore possible, because these and the tube can be separated from one another by simple screwing or retraction movements according to whether the bars run helically or in a straight line.

As material for the manufacture of the tubes all mouldable materials suitable for a casting, pressing or injection procedure can be used for example metals, casting, resin, duroplastic or thermoplastic materials. Of the thermoplastic materials acetyl resin has proved to be particularly suitable.

The invention will now be described in more detail with reference to the accompanying drawings, wherein:

FIG. 1 shows a half-sectional side view of a conical tube made according to the invention;

FIG. 2 is a similar view of a cylindrical tube;

FIG. 3 is an end view of the tapered tube shown in FIG. 1, looking at the lefthand end of that figure;

FIG. 4 is a transverse section on the line IV—IV of FIG. 1;

FIG. 5 is a side view of a further example of conical tube made according to the invention;

FIG. 6 is a part-sectional view of a modified example of a cylindrical tube made according to the invention;

FIG. 7 is a transverse section through the mould parts used for the manufacture of the sleeve illustrated in FIG. 6, the mould parts being in mutually separated disposition;

FIG. 8 is a side view, partly in section of the inner mould part for the manufacture of the tube shown in FIG. 1, and including a portion of the outer mould part;

FIG. 9 is an axial section of the outer mould part for the manufacture of the tube illustrated in FIG. 1;

FIG. 10 is a part-sectional elevation of a tube closed at one end for use in processing ring yarns as described below; and FIG. 11 is a fragmentary part sectional view of the tube shown in FIG. 10.

The tubes illustrated in FIGS. 1, 3 and 4 each consist of two imperforate end rings 1 and 2, which are connected to one another in co-axial arrangements by two sets of bars 3 and 4, the inner face of the bars 3 and the outer faces of the bars 4 running along the imagined conical outer surface of the tube. The outer set of bars 3 run parallel to the generating lines of such imagined surface and are straight. The bars 4 of the inner set run along parallel helical lines and at the contact faces 5 the material forming the two sets of bars flows together so that both sets of bars form a connected body, or united junction. The same applies to the connection of the bars 3 and 4 to the end rings 1 and 2, the material of which likewise flows together with the material of the bars at the relevant contact faces, or junctions, so that the whole tube, consisting of the end rings 1 and 2 and the bars 3 and 4 which form the yarn receiving wall of the tube, is an integral one-piece element. As the material suitable for casting, pressing or injection moulding there may be used a metal, a synthetic resin (thermosetting or thermoplastic) preferably an acetyl resin, or a propylene resin. The outer face of the bars 3 of the outer set is provided with a slight grooving or scoring 6 by which the winding on of yarn is facilitated. The end rings 1 and 2, set of bars 3 and set of bars 4, forming the tubes of FIGURES 1 to 5 are all within a predetermined annular volume of revolution, the set of bars 4 being in the annular volume of revolution of end ring 1 and the bars 3 being in the annular volume of revolution of the end ring 2.

The tube illustrated in FIG. 2 differs from that shown in FIG. 1 only in that the imagined outer surface of the tube is cylindrical. The corresponding parts of the tube body in this embodiment are therefore indicated with the same reference numbers as in the embodiment according to FIG. 1.

In FIG. 5 a conical tube is illustrated, the body of which likewise consists of two end rings 11 and 12 and two sets of bars 13 and 14, those of each set running parallel to one another along the imagined outer surface of the tube, and forming parallel slots therebetween. This tube differs from the embodiment according to FIG. 1 only in that the bars 13 of the outer set are not straight but, like those 14 of the inner set, run along parallel helical lines. As shown, the helical axes of the sets of bars 13 and 14 have the same pitch but are in opposite direction of rotation so that the bars 13 of the outer set cross the bars 14 of the inner set, forming the yarn receiving wall of the tube at an angle. The outer upper face of the bars 13 of the outer set is provided with a grooving 16 as in the previously-described embodiments.

In FIG. 6 a cylindrical tube is illustrated which, like the tube according to FIG. 5 has two sets of bars 23 and 24 running helically in opposite directions of rotation. This embodiment differs however from the embodiment according to FIG. 5 in that the bars of the different sets instead of being at two different radial distances from the axis of the tube are all at the same distance from such axis, the bars of the two sets penetrating at their junctions so that a single connected wall is formed having generally parallelogram or diamond-shaped openings 27. The bars 23 and 24 are provided on the outer face with slight groovings 26.

The bars 23, 24 have sloping sides, which results in the openings 27 having tapered sides, as appears clearly in the lower portion of FIG. 6. The advantage of this tapering is mentioned below.

In FIG. 7 there is illustrated a mould for the manufacture of the tube shown in FIG. 6. This mould consists of a one-piece inner mould part or core 100 with cylindrical outer face 101, and a four-piece outer mould part 102. In the inner face 103 of this outer mould part 102 are provided helical channels 104 for the casting, pressing or injection of the bars 23 and 24. Arranged in the ends of the mould parts 100 and 102 are annular channels not shown in the drawing for the end rings 11, 12 of the sleeve according to FIG. 6, which annular channels communicate with the ends of the channels 104 for the bars 23 and 24.

If the pieces of the outer mould part 102 are placed together on the inner mould part 100, then the interrupted inner face of the outer mould part 102 contacts the cylindrical outer face 101 of the inner mould part 100 at the places where the openings 27 of the tube are to be formed leaving the channels 104 clear to receive the material of the bars. The helical channels 104 for the bars 23 and 24 and the annular channels for the closure rings form a connected system into which the tube material is cast, pressed or injected.

The mould according to FIG. 7 has the advantage that the helical channels can easily be manufactured by machining and that upon casting, pressing or injection of the tube a continuous flow of the material to be cast, pressed or injected is ensured, so that there result no flow seams which could adversely effect the strength of the tube. The flowing material follows substantially the helical direction of the channels 104, no return or lateral flow being necessary for surrounding the studs or pins which form the openings 27.

As will appear from FIG. 7, as the sections of the outer mould part are separated, in the opening of the mould, the tapered side walls of the openings 27 facilitates the separation of the mould from the moulded tube.

The mould illustrated in FIGS. 8 and 9 for the manufacture of the sleeve according to FIG. 1 consists of a conical one-piece inner mould part 200 and a likewise one-piece outer mould part 202. For the shaping of straight outer bars 3 there are provided in the conical inner face 203 of the outer mould part 202, straight channels 204 running along the generating line of this conical face, which channels commence at the places 205 in the annular part 203' of the conical face 203, provided as the outer wall for the end ring 1, and communicate at their other end 206 with an annular channel 207 in the conical face 203. The annular channel 207 is provided for the formation of the end ring 2 of the sleeve according to FIG. 1.

In the conical face 201 of the inner mould part 200 are provided parallel helical channels 208 having the same direction of rotation and the same pitch, which channels commence at their one end 209 on an annular part 201' of the face 201 and lead at their other end 210 into an annular recess 211 in the outer face 201. The channels 208 and 211 serve for receiving the material which forms the bars 4 of the inner set and the upper closure ring 1, whereas the channels 204 in the outer mould part serve for receiving the material which forms the bars 3 of the outer set.

When the inner mould part 200 is introduced into the outer mould part 202 the outer conical face 201 of the inner mould part contacts the inner conical face 203 of the outer mould part, whereby the hollow spaces formed by the channels 204, 207, 208 and 211 form a connected channel system for receiving the cast, pressed or injected mass. If during the manufacture of the tube the material filling the channel system is hardened, then the outer mould part 202 can be drawn off endwise by a straight movement of the sleeve in the direction of the axis of the tube; it is not prevented by the bars 204. When the outer mould part 202 has been drawn off, then the tube illustrated in FIG. 8 can be screwed out of the mould part 202 by rotation in an anti-clockwise direction. Because of the one-piece form of the two mould parts the ridges are formed and the tube can therefore be used without subsequent treatment.

The mould for the manufacture of the sleeve according to FIG. 2 corresponds substantially with the mould illustrated in FIGS. 8 and 9 except that the surfaces 201 and 203 are cylindrical.

The mould for the manufacture of the sleeve according to FIG. 5 differs from the mould according to FIGS. 8 and 9 only that the mould channels 204 corresponding to the course of the bars 13 are likewise helical so that, for the removal of the inner and outer mould parts from the moulded tube, each of these must be rotated around its axis in the corresponding direction of rotation.

Referring now to FIGS. 10 and 11 there is shown a tube suitable for use in the textile industry for the spinning of yarn in a ring frame and for the subsequent wet processing of the package of spun yarn, for example in a dyeing, bleaching or washing machine, without any intermediate re-winding of the yarn.

The tube concerned is a one-piece synthetic moulding 300 made according to the process and with an apparatus as above described, in particular as described with reference to FIG. 6. The tube is shaped interiorly to fit on to the normal spinning spindle of a ring spinning frame, and is closed at the top 300a so as to allow of its being automatically retained in a ferrule (not shown) at its lower end, in a dyeing machine by the pressure of dye liquid sucked through the yarn package into the tube and into the ferrule. In cases where it is desired to pass the treatment liquor through the package from the inside outwards, either continuously or alternately with a reverse flow mechanical means will be provided for holding the tubes down on the said ferrules. Many arrangements suitable for this are known in the art. The tube is provided with diamond shaped openings 301 which result from the use of that form of the invention described above in connection with FIG. 6. That is to say the two flow streams, in opposite helical directions are within the same annular volume of revolution and flow smoothly past the diamond-shaped projections in the mould which form the openings 301.

Perforated tubes for the pressure dyeing of yarn have already been proposed but these could not be made satisfactorily as one-piece synthetic mouldings because they had round holes and, in the moulding of the tubes the direction of flow of the material around the parts which shaped the round hole was of such varied direction that flow seams and inadequate joining resulted. Perforated metal tubes have been proposed but these are very costly in view of the large number required by the spinners.

The application of the present invention to the making of this textile tube 300 allows of a perfect moulding as the flow streams are merely in the two helical directions, with complete contiguity, and the material flowing in the mould does not need to deviate from these two directions.

As shown the tube 300 comprises a slender tapered body part having the rounded closed top 300ª and an interior taper 300ᵇ at the lower end adapted to fit the taper of a ring spinning spindle in the normal way. The tube is formed with rows of equally spaced diamond-shaped openings 301, those in one row being staggered relatively to those in the next row, and the rows converging together in conformity with the taper of the tube. The side faces of the openings 301 are tapered as was described in connection with FIG. 6 so as to allow of the rapid and clean separation of the sections of the outer mould part from the completed tube, see FIG. 7.

The openings 301 are illustrated more precisely in FIG. 11 which is an enlarged part-sectional view through the tube wall. The openings may have their major diagonal transversely of the tube, as shown, or they may have that diameter longitudinally of the tube. An advantage of these diamond-shaped holes, especially with their major axes arranged at right angles to the longitudinal axis of the tube is that they provide slight depressions in the profile of the tube (see FIGS. 6 and 11) into which some of the turns of the wound-on yarn will lie and by which thereby the yarn package is more securely keyed longitudinally of the tube. Nevertheless these depressions are so slight as not to interfere with the winding off of the yarn, and in fact they have the further advantage that they precent slipping or sloughing off of the yarn as might be the case with a continuous tube surface.

The tube shown is formed near the lower end with a slight annular rib 302 and at the upper end with a slight annular depression 303. This depression could, if desired, be replaced by a second annular rib. The purpose of these annular formations is to indicate to the spinner the limits between which the yarn must be wound. This indication need only be slight and could be little more than a line.

In the making of the tube shown, using the separable mould parts as illustrated in FIG. 7 the upper end of the tube could be formed in a mould end part separable in an axial direction from the parts (of FIG. 7) forming the side walls and the parting line between such mould end part and the side wall parts could conveniently be located in the plane of the said groove 303.

Near the upper end of the tube there is a fine hole 304 which serves as an air release to allow the escape of air when the tube is being fitted on to the spinning spindle. This hole 304 is however so small as not to interfere with the flow of the treatment liquor through the package.

In order to remove any slight flash left at the parting lines between the mould parts 102 the finished tube is subjected on its outer face to a very slight abrasive treatment. This has the advantage also of slight roughening the surface of the tube which therefore is less liable to allow slipping or sloughing of the yarn.

What we claim is:
1. A yarn tube adapted for the fluid treatment of the yarn wound thereon, said tube comprising:
 a one piece, hollow, body of plastic material having a yarn receiving wall extending between a pair of opposite, imperforate, end rings each having an annular volume of revolution;
 said yarn receiving wall consisting of at least two sets of spaced apart, integral bars of said material, each bar of each set extending continuously from one said end ring to the other;
 said sets of bars lying in crossing directions and mutually forming a plurality of integral, connected junctions and a plurality of fluid openings, both of generally parallelogram outline;
 at least one of said sets of bars running in a helical direction and each said set of bars being in the annular volume of revolution of one of said end rings.

2. A yarn tube as specified in claim 1 wherein two sets of said integral bars are provided, the bars of each set being parallel to each other.

3. A yarn tube as specified in claim 2 wherein the bars of one said set are straight, the bars of the other said set are helical and said straight bars lie outside, and across, said helical bars.

4. A yarn tube as specified in claim 2 wherein all of the bars of both said sets lie in the same annular volume of revolution.

5. A yarn tube as specified in claim 2 wherein the bars of both sets are helical, those of one set lying in the opposite direction from those of the other set.

6. A yarn tube as specified in claim 2 wherein the bars of one said set are straight, parallel to the axis of said tube, spaced apart to form axially extending slots and are located on the outside of the wall of said tube and the bars of the other said set are helical, spaced apart to form helical slots and located on the inside of the wall of said tube, said bars forming a lattice-work having said fluid openings therein.

7. A yarn tube as specified in claim 1 plus an outer surface on the bars of said wall having a plurality of slight grooves, for facilitating the winding of yarn thereon.

8. A yarn tube as specified in claim 1 wherein said body is tapered, closed at the small end thereof and provided with an inner tapered face at the large end thereof adapted to fit the taper of a conventional ring spinning spindle.

9. A yarn tube as specified in claim 4 wherein the bars of each set are helical and define diamond shaped openings.

10. A yarn tube as specified in claim 9 in which the portion of said bars forming walls defining said diamond shaped openings are inclined, the smaller end of the openings being in the inner wall of the tube.

11. A yarn spinning and dyeing tube comprising:
 a one piece, hollow body of synthetic, plastic, material having a yarn receiving wall extending between a pair of opposite, imperforate, annular end rings;
 said yarn receiving wall consisting of a first set of parallel bars and a second set of parallel bars;
 each bar being integral with, and extending continuously between, said end rings, the bars of each set being parallel to each other and all in the same annular volume of revolution;
 the bars of one set being disposed angularly with relation to the bars of the other set in a lattice pattern with integral connected junctions to define a plurality of generally diamond-shaped openings therebetween for the passage of dye fluid.

12. A combination as specified in claim 11 wherein the bars of said first set are straight, the bars of said second set are helical and the annular volume of revolution of said first set is outside the annular volume of revolution of said second set.

13. A combination as specified in claim 11 wherein the bars of both said sets are helical and in different annular volumes of revolution.

14. A combination as specified in claim 11 wherein said first and second sets of bars are in a common annular volume of revolution, and wherein one said imperforate annular end ring includes a domed closure having a minute orifice therethrough for the escape of air.

References Cited by the Examiner
UNITED STATES PATENTS

| | | | |
|---|---|---|---|
| 394,778 | 12/1888 | Lippitt | 68—198 X |
| 1,530,433 | 3/1925 | Stadler | 68—198 X |
| 2,071,090 | 2/1937 | Simonds. | |
| 2,217,459 | 10/1940 | Slaughter | 68—198 |
| 2,746,280 | 5/1956 | Russell | 68—198 |
| 2,818,222 | 12/1957 | Scholl | 242—118.11 |
| 2,949,636 | 8/1960 | Mastin | 18—42 |
| 3,058,158 | 10/1962 | Aghnides | 18—42 |

IRVING BUNEVICH, *Primary Examiner.*